June 30, 1964   W. A. VAN DEN BROEK ETAL   3,139,067
SWIMMING POOL APPARATUS
Filed Sept. 11, 1962   2 Sheets-Sheet 1
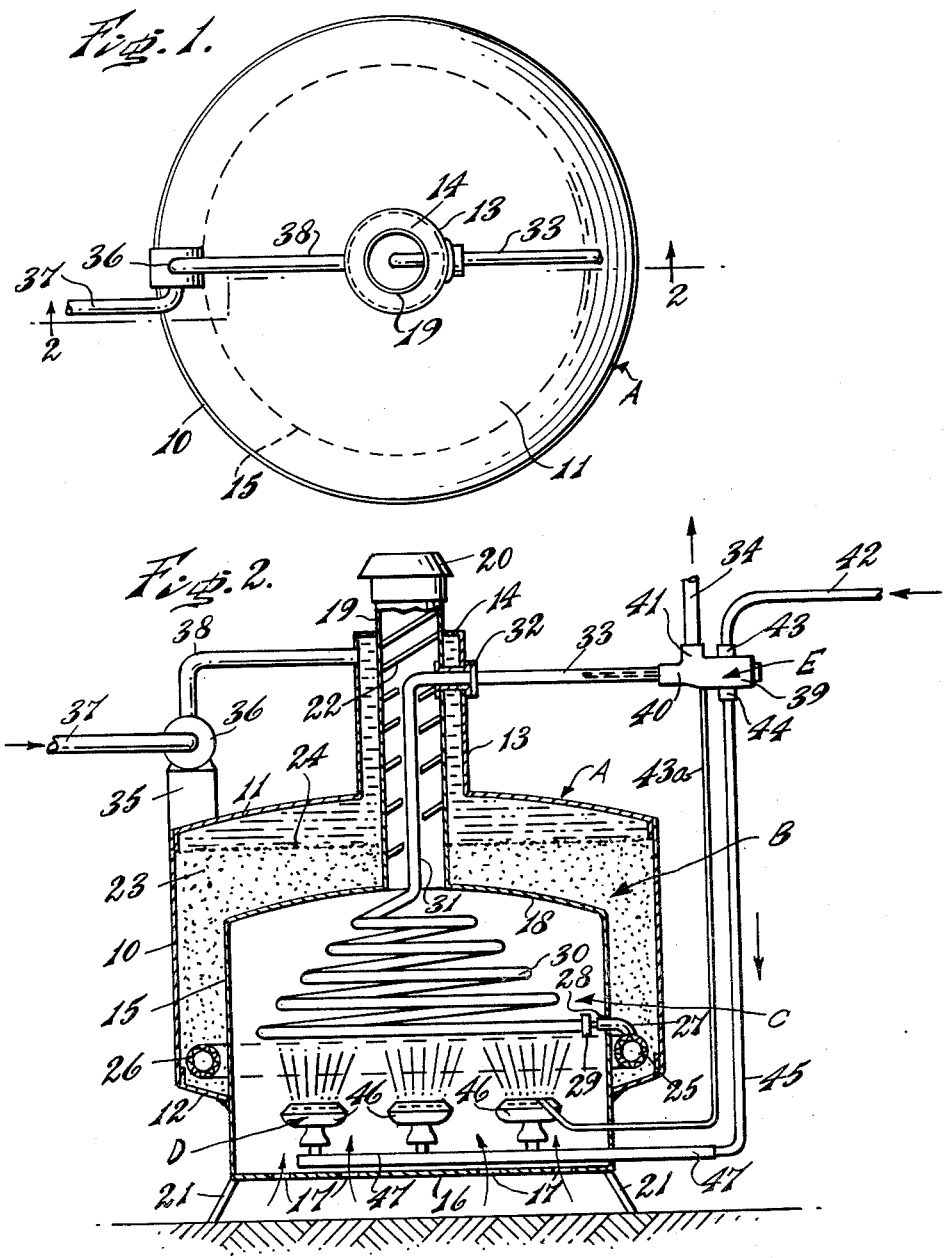
INVENTOR
William A. Van Den Broek
Ira Silverman
BY
Bilker + Moyerman
ATTORNEYS June 30, 1964  W. A. VAN DEN BROEK ETAL  3,139,067
SWIMMING POOL APPARATUS
Filed Sept. 11, 1962  2 Sheets—Sheet 2

INVENTOR
William A. Van Den Broek
Ira Silverman
BY
Bilker + Moyerman.
ATTORNEYS

United States Patent Office 3,139,067
Patented June 30, 1964

3,139,067
SWIMMING POOL APPARATUS
William A. van den Broek, Haddonfield, N.J., and Ira Silverman, Chalfont, Pa., assignors to Sylvan Pools, Inc., Doylestown, Pa., a corporation of Pennsylvania
Filed Sept. 11, 1962, Ser. No. 222,826
15 Claims. (Cl. 122—18)

This invention pertains to swimming pool water treatment apparatus. More particularly, it pertains to a unitary apparatus which combines the functions of heating and filtering. In brief, it pertains to a high capacity swimming pool filter-heater combination.

The utility of, and need for, swimming pool filters has long been recognized. With such apparatus fine foreign matter can be removed from water and original clarity maintained and restored. Often chemical additives, such as flocculents, are used in connection with the filter to increase the effectiveness of filtration. Filters are therefore essential items of equipment in pools where water is recirculated and where the only water added is that which replaces evaporation or overflow losses.

Less essential to pool operation, but of increasing importance, are swimming pool water heaters. These devices enable the season for use of outdoor pools to be extended from early spring to late fall. Unlike domestic water heaters, where a relatively small quantity of water is to be heated through a large number of degrees (e.g., from ambient to 140° F.), these heaters heat large volumes of water through a relatively small number of degrees. In typical applications, heaters are used to maintain swimming pool temperatures in the range of 75–80° F. when daily average or mean ambient temperatures are as low as 60° F.

Customarily the filtration and the heating functions are performed by separate, unrelated units—a filter and a heater. The instant invention pertains to a unitary appaartus which combines both functions in an integral device in a manner which gives complete and simple, fail-safe control and which sacrifices efficiency of neither function in combining the two units.

Accordingly, it is an object of the invention to provide a combination filter-heater which can heat and filter simultaneously and perform both functions with high efficiency.

It is also an object of the invention to provide an improved filter-heater combination wherein filtration can be performed in a relatively shallow depth of siliceous filter medium, thus making possible construction of a unit having a relatively low height.

Another object of the invention is to provide an improved filter-heater combination wherein a substantial portion of the heat exchange means is readily renewable and replaceable.

Provision of a combined filter-heater wherein condensation on combustion chamber walls is minimized, is also an object of the invention.

An additional object of the invention is to provide an apparatus of the type described wherein control of outlet water temperature is accurate and control of gaseous fuel is safe, utilizing no complicated or sophisticated components liable to be a source of future maintenance and adjustment problems.

Also, among the objects of the invention, is the provision of a swimming pool filter-heater combination wherein a novel underdrain or collector is employed to minimize siliceous filter medium depth and to allow for high capacity efficient filtration in low units.

A further object of the invention is to provide a single piece of apparatus which will serve as a filter, a heater, a pump mount or bed plate and which will include self-contained control devices so that the totality of the apparatus can be inserted in swimming pool piping and need only be connected to energy sources to be rendered operational.

Still another object of the invention is to provide a filter-heater which may use a variety of liquid and gaseous carbonaceous fuels.

Other objects of the invention are to provide an improved apparatus of the character described which is sturdy in construction, economical to produce and install, and highly efficient in operation.

These and other related objects of the invention will be apparent to those skilled in the art from a consideration of the description which follows, when read in conjunction with the accompanying drawings, in which:

FIGURE 1 represents a fragmentary plan view of an embodiment of the invention.

FIGURE 2 represents a partial section taken along line 2—2 of FIGURE 1, modified to include diagrammatic representation of flow through the apparatus.

Figure 3:
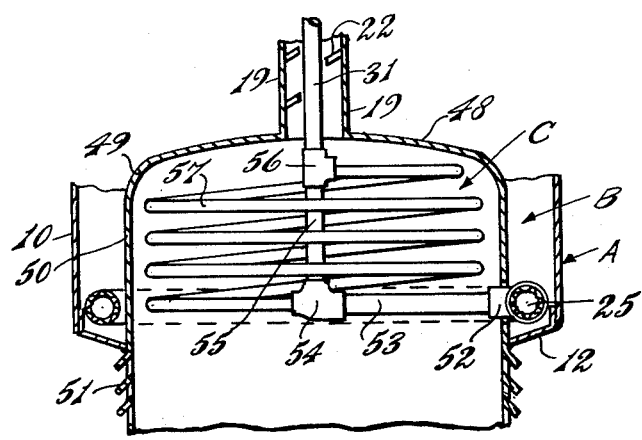
FIGURE 3 represents a fragmentary section through a modified embodiment of the invention.

Referring now to the drawings, wherein like numerals designate like parts, it will be observed that the filter-heater combination comprises a shell A, having within it a filter section B and a combustion chamber C. Caloric energy for the combustion chamber C is supplied by a burner assembly D and fuel flow to the burners is controlled by thermostatic controller E.

The shell A, as may best be seen in FIGURE 2, comprises a vessel having a cylindrical wall portion 10 to which is affixed a top 11, preferably dished, and a bottom 12 which is also preferably dished to provide smooth internal corners and thus prevent hydraulic turbulence. Top 11 and bottom 12 are affixed to wall 10 by welding as is customary in the fabrication of code pressure vessels. Top 11 is provided with a central circular cut-out to which is affixed a riser 13, capped as at 14 in any suitable manner.

The shell A is mounted on, affixed to and supported by combustion chamber C. Chamber C includes cylindrical side walls 15, a flat foraminous bottom 16 affixed thereto which contains a plurality of variable diameter air inlet orifices 17, a head 18 preferably dished, and a chimney 19 which is capped by a draft hood 20. The entire chamber C is supported by a plurality of legs 21 and chamber C, in turn, supports shell A which is mounted coaxially thereupon. Chimney 19 is provided with a plurality of internal baffles or retarders 22 which insure more efficient combustion and lower stack outlet temperatures. The baffles may be formed of a single piece having a helical configuration or of a plurality of separate units.

The annular space between the exterior of combustion chamber C and the interior of shell A defines and constitutes filter section B. It should be noted immediately that the net effective cross-section of this filter section, proximate side walls 15, is far less than the cross-section above dished head 18. Consequently, when water moves downward (with reference to FIGURE 2) there is an increase in velocity as it enters the narrowed annulus between wall portion 10 and side wall 15. The advantages of this physical design consideration as they relate to high filtration capacity will be discussed below. Section B is filled with a sandy filter medium 23 which extends downward from water-filter medium interface 24. The bottom of section B is provided with a high capacity collector 25. This collector, of novel design, is ring shaped in plan view and circular in cross section. While it may be made of perforated metal, it is preferably fabricated of a synthetic corrosion resistant material such as, for example, a long chain polyamide of the nylon type. The sleeve may be formed of an inner and outer layer of material reinforced and spaced apart by a metal wire spider 26 which gives it rigidity and prevents its collapse. At at least one point on its perimeter, collector 25 is provided with an outlet fitting or transition piece 27 which penetrates wall 15 in water-tight juxtaposition thereto, as at socket 28 and is, in turn, coupled to a fitting which is readily disassembled, such as union 29, located within chamber C.

Chamber C also contains a helical coil 30 made of any suitable tubular heat-conductive material such as copper or a copper alloy, which is located coaxially with respect to the longitudinal axis of the chamber. Coil 30 may include a union or other similar device (not shown) proximate the base of chimney 19 to facilitate its ready removal and replacement. A vertical section of pipe 31 is located within the chimney, surrounded by baffles 22, and leaves the unit through sleeve 32 which spans from the interior of chimney 19 to the exterior of riser 13. Discharge line 33, which is in effect a continuation of line 31, connects to controller E. Filtered and heated water moves to the pool through return conduit 34 as indicated by the arrow in FIGURE 2.

Mounted on the shell A, as with a bracket or weldment 35, is a pump 36 which may be of any conventional type including preferably self-priming centrifugal. Pump 36 takes its suction from the pool through suction line 37 and discharges, via conduit 38, into the interior of riser 13.

The hydraulic circuit, when the unit is heating and filtering may be summarized as follows: The pump 36 takes water from the pool through suction line 37 and pumps it, via conduit 38, to the upper portion of the annulus between riser 13 and chimney 19. Water flows downward past interface 24, through filter medium 23 and thence into collector 25. From the collector the fluid passes through outlet 27, through coil 30, pipe portions 31 and 33 and thence, via controller E and line 34 is returned to the pool. Preliminarily it should be noted that any expansion of liquid (e.g., as by heating during periods when the pump is not running) merely causes the incremental volume of liquid to flow to the pool through the unobstructed flow path just described.

The filter medium is backwashed in a conventional manner by reverse flushing with a stream of water and running the effluent to a sewer. Auxiliary piping for supplying wash water to the collector via line 31 and for removing effluent to the sewer, as well as a multiport valve for use during the backwash period are conventional, form no part of the instant invention and are, accordingly, not shown.

The thermostatic controller E is a conventional unit such as are sold under the trademark Unitrol by the Grayson Controls Division of the Robertshaw-Fulton Controls Co. and are described fully, inter alia, in their bulletins 28–050–0046 and 28–050–0069D as well as in U.S. Patent Numbers 2,953,937 and 2,982,148. Briefly reviewing its operation, it uses water temperature as a parameter for controlling gas flow while at the same time supplying a pilot light quantity of gas to the burners independent of temperature variations. It further incorporates manual on-off features and fail-safe mechanisms which detect the absence of flame and shut off the gas supply in such an event. An advantage of the instant invention, compared to the prior art, is its ability to use such relatively standard controls rather than combinations of relays, solenoid valves and remote sensors. The logic of control will be discussed in more detail below.

Returning now to the description of controller E, it comprises a body or housing 39 having an associated water passage or T including an inlet 40 and an outlet 41. As can be seen in the drawing, heated water returning to the pool passes through the passage. A bimetallic element extends into the water passage and senses the temperature therein. Fuel gas (e.g., natural or manufactured) from main gas line 42 enters the controller through gas port 43. Within the unit, the gas flow is split into a pilot stream and a burner feed stream, the former being conveyed to the pilots by pilot line 43a and the latter leaving through burner feed port 44 and flowing to the burners via feed line 45. The burners, indicated generally as 46, may be suitably mounted within the combustion chamber, as on header 47. A preferred burner is made of cast iron with an annular port which distributes an even and continuous halo pattern flame concentrated over predetermined portions of coil 30. The pilot associated with each burner may be side mounted for quick lighting and the pilot flame is not affected by off and on actions of the burners.

Turning now to a discussion of the apparatus and its superiority compared to prior art apparatus, consider first the filtration function. The filter medium 23 is fine sand. Such material is used in conventional sand and gravel filters but in these filters is supported by coarse sand which is in turn supported by a bottom layer of pea gravel. This arrangement equalizes hydraulic resistances over the cross section of the filters and yet just the fine sand performs the filtration. In the embodiment of the invention shown, the collector 25 is of extremely large effective area and because of its annular shape presents a uniform hydraulic resistance at any point in the bottom of filter section B. Bottom 12 supports the sand and thus the two functions of the conventional gravel bed, support and hydraulic equalization, are performed by the apparatus itself. On backwash, other advantages are apparent. The backwash stream leaves collector 25 at a uniform perimetrical rate and distribution and any tendency to channel is avoided because flow, of necessity, is at a high velocity due to the restricted cross section between wall 15 and wall 10. There is more than enough mass flow volume to scour the entire cross section of the annulus.

The heating and control functions also are effected in a manner which simultaneously achieves high efficiency and trouble-free operation. When the unit is started, the pilots are lit and gas continues to flow through pilot line 43a as long as the controller E permits. The controller, as is customary, contains a safety pilot shut off valve which automatically shuts off gas to burners 46 and their associated pilots if there is an interruption to flow of gas in line 42. Controller E also includes a snap action bimetallic thermostat which senses the temperature of water in line 33 and which cuts off flow of gas through feed line 45 when the temperature rises above a pre-set point. Thus, flow of gas to burners 46 is an inverse on-off function of discharge water temperature. Air to support combustion enters through orifices 17, which may be properly adjusted for $CO_2$ content in the flue gas, and the flue gas is vented through hood 20. The baffles reduce stack temperature so that hood 20 is generally safe to touch but, more important, the chimney 19 at its hottest and most dangerous levels, is completely water jacketed by riser 13.

Prior art control systems required a relay, a solenoid-operated gas flow valve, a normally-closed thermostat which measured inlet water temperature (i.e., pool temperature) and a flow sensor which indicated whether there was flow in the filter. Rise of inlet water temperature above a pre-set value (e.g., 75° F.) or cessation of flow, as when the pump stopped running, would open a normally-closed relay circuit (in which the flow sensor and thermostat were in series) and cause the gas valve to shut.

In the instant invention, no such elaborate control system is required since outlet temperature in line 33 is the control parameter, and gas flow through 45 ceases on rise. Thus, if the pump stops running, the outlet temperature, aided by convection currents will rise and the burners will shut down promptly. One is better able to exercise control since the temperature in line 33 directly reflects operating conditions in the filter-heater and is instantly responsive to burner operation. On the other hand, inlet temperature as in line 38 has a large inherent lag and little sensitivity since flow is from a large body of water (i.e., the swimming pool) which takes a long time to heat. Even with faulty operation, such as a condition which causes overheating of water even to the boiling point, inlet conditions would be normal and control thus rendered ineffective. In the instant invention not only are controls simple but a sensitive point is used for a parameter.

Heat exchange is effected not only through coil 30 but also through walls 15, head 18 and chimney 19. Baffles 22 make for more efficient heat exchange in the chimney. But a concomitant result of the design is that these surfaces operate at temperatures above those at which internal condensation would occur and thus the life of the unit is extended. As has previously been mentioned, coil 30 is preferably renewable.

In FIGURE 3 a variant of the invention is shown which primarily affects heat exchange and combustion chamber C. In this embodiment the chamber C is provided with a dished head 48 which includes radiused perimeter 49. Such smooth, rounded configuration improves flow characteristics within filter section B and also improves back washing. The chamber also includes side walls 50 which are provided with louvers 51. A chamber of this type may have a solid bottom and be set directly on a pad or on the ground since combustion air enters through louvers 51. The burners are not shown since they are similar to those discussed in connection with FIGURE 2.

The principal modification, however, involves the heat exchanger. As shown in FIGURE 3, collector 25 is provided with a T 52, two legs of which are connected to ends of the collector. T 52 discharges into a horizontal long nipple 53 which is connected to a reducing T or saddle L 54. A vertical nipple 55, which extends substantially the height of chamber C on its longitudinal axis, is connected to a reducing T 56, the straight run of which connects to pipe 31 (which is similar to pipe 31 in FIGURE 2). Mounted between the reduced outlets of T 56 and saddle L 54 is a helical heat exchange coil 57 of reduced diameter. As shown, the coil 57 is mounted coaxially about vertical nipple 55. With this by-pass construction, more heating surface is provided, lower water velocities are realized through the coil and condensation within chamber C is further decreased. The smaller coil diameter makes for greater temperature differentials. It also improves gravity circulation when the pump 36 is not operating, causing faster rise in water temperature in the water passage of housing 39. Since the hydraulic resistance through nipple 55 is lower than through coil 57, less pressure drop occurs during the filter cycle, flow through the coil is relatively unaffected by pressure drop through the filter and flow during backwash (when flow through pipe 31 is reversed) is increased.

In summary, the high capacity collector system, combined with the elimination of gravel beds, makes possible high filtration rates in a compact unit. Because of the large flow which is possible through the filter, equally large quantities of water can be passed through the heat exchange means and sufficient heat transferred to the swimming pool to keep it at desired temperature levels. For example, in one embodiment of the invention, suitable for heating pools as large as 40,000 gallons, the height of straight side 10 is only 16″ and the diameter of shell A is only 42″. Yet this unit can filter about 3600 gallons per hour of water when a pump rated at 25 ft. Total Discharge Head is used and transfer about 150,000 B.t.u./hr. Normally, such a unit would be adjusted to raise water temperature, for instance, approximately 5° F. on a single pass. As pressure drop increases through the filter (e.g., as it gets dirty) the differential could rise to above about 15° F. It is obvious that the same number of B.t.u. could be added to a lesser quantity of water. Some of the filtered water could be returned directly to the pool through a by-pass with the balance going to the heat exchanger where its temperature could be raised a greater number of degrees to still effect the same amount of heat transfer. Such variants, where the quantity of water passing through the heat exchanger and the filter sections are not necessarily the same are within the scope of the invention.

While the apparatus has been described with respect to a gaseous fuel such as natural gas, manufactured gas, mixtures thereof, bottled gas and the like can be used. The apparatus lends itself to the use of oil fired equipment. While this necessitates some modifications with respect to the combustion chamber C (e.g., provision of a lining) and the control system (e.g., ignition control from a stack relay, activation of burner by an aquastat, etc.) the fundamentals of the apparatus are unchanged.

Although our invention has been described in considerable detail, such description is intended to be illustrative rather than limiting since the invention may be variously embodied and, therefore, the scope of the invention is to be determined only by the appended claims.

Having described our invention, we claim:

1. A swimming pool filter-heater comprising a generally cylindrical shell having a dished head, a dished bottom, and a riser mounted on a cut-out on said head and extending upward therefrom, said riser being provided with an inlet proximate the top thereof; a generally cylindrical combustion chamber having a dished head including a chimney centrally mounted on a cut-out in said head and extending upward therefrom; means for admitting combustion air to said chamber; said shell being coaxially mounted on and supported by said chamber so that said chimney is encircled by said riser and the dished head of said shell is longitudinally spaced apart from the dished head of said chamber; a filter section defined by the annulus between the exterior of said chamber and the interior of said shell containing a siliceous filter medium; a ring shaped collector mounted in the bottom of said filter section and embedded in said filter medium, said collector being circular in cross-section and including an inner and outer layer of fabric spaced apart and reinforced by a metal spider; a heat exchanger removably mounted within said combustion chamber including a coil portion mounted about the longitudinal axis of said chamber and a vertically extending continuation thereof within said chimney; conduit means connecting the inlet of said heat exchanger and the interior of said collector through the wall of said combustion chamber; outlet water conduit means connected to said heat exchanger penetrating said chimney and the exterior of said riser; means for feeding swimming pool water to said riser inlet comprising a pump mounted on said shell, the discharge of which is connected to said riser inlet; fuel burners mounted in said combustion chamber beneath said heat exchanger; pilot means operatively associated with said burners; a thermostatic fuel controller including a water temperature sensor to activate fuel valves which independently control burner fuel and pilot fuel, manual on-off means, and means for shutting fuel flow upon flame failure; said outlet water conduit means being adapted to be connected to said temperature sensor portion of said controller and thence to the swimming pool; fuel lines independently connecting said burners and said pilots to said controller; said controller cutting off fuel supply to said burners upon rise of water temperature in said outlet water conduit above a predetermined point; means for passing a controlled volume of air through said combustion chamber and means for retarding the discharge of resultant combustion products through said chimney.

2. The filter-heater of claim 1 which further includes a by-pass directly connecting the interior of said collector and said outlet water conduit, said by-pass including a vertical portion about which said coil portion is coaxially mounted, said by-pass having a larger internal diameter than said coil.

3. A swimming pool filter-heater comprising a generally cylindrical shell having a dished head, a dished bottom, and a capped riser mounted on a cut-out in said head and extending upward therefrom, said riser being provided with an inlet proximate the top thereof; a generally cylindrical combustion chamber having a dished head and further including a chimney mounted centrally on a cut-out in said head and extending upward therefrom; means for supplying combustion air to said chamber; said shell being coaxially mounted on and supported by said chamber so that said chimney is encircled by said riser and the dished head of said shell is longitudinally spaced apart from the dished head of said chamber; a filter section defined by the annulus between the exterior of said chamber and the interior of said shell containing a siliceous filter medium; a ring shaped collector mounted in the bottom of said filter section and embedded in said filter medium, said collector being circular in cross-section and including an inner and outer layer of fabric spaced apart and reinforced by a metal spider; a heat exchanger removably mounted within said combustion chamber; conduit means connecting the inlet of said heat exchanger and the interior of said collector through the wall of said combustion chamber; outlet water conduit means connected to said heat exchanger penetrating said chimney and the exterior of said riser; means for feeding swimming pool water to said riser inlet; gas burners mounted in said combustion chamber beneath said heat exchanger; pilot means operatively associated with said burners; a thermostatic gas controller including a water temperature sensor to activate gas valves which independently control burner gas and pilot gas, manual on-off means, and means for shutting gas flow upon flame failure; said outlet water conduit means being operatively associated with said temperature sensor portion of said controller; gas lines independently connecting said burners and said pilots to said controller; said controller cutting off gas supply to said burners upon rise of water temperature in said outlet water conduit above a predetermined point; and means for passing air through said combustion chamber.

4. The filter-heater of claim 3 wherein said heat exchanger includes both a coil portion and a linear portion, said linear portion serving as a simultaneous alternate hydraulic flow path with said coil portion.

5. A swimming pool filter-heater comprising a shallow shell having a dished head, a bottom, a capped riser mounted on a cut-out in said head and extending upward therefrom; said riser being provided with an inlet; a combustion chamber having a head and a bottom including a chimney mounted on a cut-out in said head and extending upward therefrom; said shell being coaxially mounted on and supported by said chamber so that said chimney is encircled by said riser and the head of said shell is longitudinally spaced apart from the head of said chamber; a filter section defined by the annulus between the exterior of said chamber and the interior of said shell; a ring shaped collector mounted in the bottom of said filter section embedded in filter medium, said collector being foraminous and circular in cross-section; a heat exchanger mounted within said combustion chamber; a conduit connecting the inlet of said heat exchanger and the interior of said collector through the wall of the said combustion chamber; outlet water conduit connected to said heat exchanger penetrating said chimney and the exterior of said riser; burners mounted in said combustion chamber beneath said heat exchanger; pilot means operatively associated with said burners; a thermostatic fuel controller including a water temperature sensor activating fuel valves which independently control burner fuel and pilot fuel, manual on-off means, and means for shutting fuel flow upon flame failure; said outlet water conduit being operatively associated with said temperature sensor portion of said controller; fuel lines independently connecting said burners and said pilots to said controller, said controller cutting off fuel supply to said burners upon rise of water temperature in said outlet water conduit above a predetermined point; and means for passing a controlled volume of air through said combustion chamber.

6. The apparatus of claim 5 which further includes baffles within said chimney.

7. The apparatus of claim 5 wherein said heat exchanger includes a coil portion mounted about the longitudinal axis of said combustion chamber.

8. The apparatus of claim 6 wherein said heat exchanger includes a coil portion mounted about the longitudinal axis of said combustion chamber.

9. A combined swimming pool filter-heater comprising a generally cylindrical outer shell having a diameter greater than its straight side height; an inner shell also of generally cylindrical shape, having a diameter less than said outer shell diameter, mounted coaxially within said outer shell and longitudinally displaced with respect thereto so that their respective heads are spaced apart, said outer shell being mounted upon and supported by said inner shell; a chimney extending upward from the head of said inner shell through the head of said outer shell; a water jacket encompassing said chimney as an integral part of said outer shell; a rigid ring shaped foraminous filter collector in the annulus between said shells near the bottom thereof; a heat exchanger mounted within said inner shell; inlet means on said outer shell; conduit means connecting said filter collector and the inlet of said heat exchanger; burners located within said inner shell beneath said heat exchanger; temperature responsive control means for controlling fuel supply to said burners; an outlet conduit connecting the outlet of said heat exchanger to said control means in temperature responsive juxtaposition; means for supplying fuel to said burners via said control means; and means for supplying a predetermined volume of combustion air to said burners and venting it through said chimney.

10. A swimming pool filter-heater comprising a cylindrical shell having a diameter larger than its straight side height, including a riser extending upward from the top thereof, said riser being provided with an inlet; a generally cylindrical combustion chamber having a diameter smaller than said shell diameter, including a chimney centrally mounted on the top thereof and extending upward therefrom; said shell being coaxially fixedly telescoped on and supported by said chamber so that said chimney is jacketed by said riser and the head of said shell is longitudinally displaced with respect to the head of said chamber; a filter section defined by the annulus between the exterior of said chamber and the interior of said shell containing a siliceous filter medium; a rigid foraminous ring-shaped collector mounted in the bottom of said filter section and embedded in said filter medium, said collector being circular in cross section; a heat exchanger mounted within said combustion chamber including a coil portion mounted about the longitudinal axis of said chamber and a vertically extending continuation thereof within said chimney; a conduit connecting the inlet of said heat exchanger and the interior of said collector through the wall of said combustion chamber; an outlet water conduit connected to said heat exchanger, penetrating said chimney and the exterior of said riser; gas burners mounted in said combustion chamber beneath said heat exchanger; pilot means operatively associated with said burners; a thermostatic gas controller including a water temperature sensor which activates gas valves to independently control burner gas and pilot gas, manual on-off means, and means for shutting gas flow upon flame failure; said outlet water conduit being connected to said temperature sensor portion of said controller and thence adapted to be connected to a swimming pool; gas lines independently connecting said burners and said pilots to said controller, said controller cutting off gas supply to said burners upon rise of water temperature in said outlet water conduit; and means for passing a controlled volume of air through said combustion chamber.

11. The apparatus of claim 10 which further includes a pump for feeding swimming pool water to said riser inlet, said pump being mounted on said shell.

12. The apparatus of claim 11 which further includes means for retarding the flow of combustion products through said chimney.

13. A swimming pool filter-heater comprising a generally cylindrical combustion chamber including a head and a bottom; a chimney mounted on a cut-out in said head and extending upward therefrom; a generally cylindrical outer shell having a diameter larger than the diameter of said combustion chamber, mounted coaxially about and supported by said combustion chamber, said outer shell including a head and a capped riser mounted on a cut-out therein and extending upwardly therefrom; said shell being oriented on said chamber so that said riser jackets said chimney and said heads are longitudinally spaced apart; an annular filter section defined by the space between the exterior wall of said combustion chamber and the interior wall of said shell adapted to contain liquid and a siliceous filter medium; inlet means associated with said filter section adapted to admit water to the top thereof; a collector having a plurality of foraminous inlets and an outlet mounted in the bottom of said filter section; a heat exchanger having an inlet and an outlet mounted within said combustion chamber; conduit means connecting said collector outlet and said heat exchanger inlet; fuel burning means mounted within said combustion chamber beneath said heat exchanger; means for regulating the amount of combustion air admitted to said combustion chamber; outlet conduit means connected to said heat exchanger outlet adapted to return heated water to a swimming pool; means for supplying fuel to said burners including a thermostatic fuel valve which utilizes liquid temperature in said outlet conduit means as a control parameter.

14. The filter-heater of claim 13 which further includes bypass means from said collector outlet to said heat exchanger outlet whereby not all of the liquid passing through said filter section passes through said heat exchanger.

15. The filter-heater of claim 14 which further includes baffles within said chimney.

References Cited in the file of this patent
UNITED STATES PATENTS

| | | |
|---|---|---|
| 767,586 | Mattheis | Aug. 16, 1904 |
| 1,211,858 | Johnson | Jan. 9, 1917 |
| 1,543,257 | Greenberg | June 23, 1925 |
| 1,737,202 | Runnels | Nov. 26, 1929 |
| 1,835,329 | Peters | Dec. 8, 1931 |